United States Patent
Trindade et al.

(10) Patent No.: US 8,710,138 B2
(45) Date of Patent: Apr. 29, 2014

(54) ETCH RESISTANT CLEARCOAT

(75) Inventors: Delson Jayme Trindade, Rochester Hills, MI (US); Robert R. Matheson, Glen Allen, VA (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 53 days.

(21) Appl. No.: 13/515,311

(22) PCT Filed: Jan. 10, 2011

(86) PCT No.: PCT/US2011/020661
§ 371 (c)(1), (2), (4) Date: Jun. 12, 2012

(87) PCT Pub. No.: WO2011/085302
PCT Pub. Date: Jul. 14, 2011

(65) Prior Publication Data
US 2012/0252959 A1    Oct. 4, 2012

Related U.S. Application Data

(60) Provisional application No. 61/293,334, filed on Jan. 8, 2010.

(51) Int. Cl.
C09D 143/04 (2006.01)
B05D 3/10 (2006.01)

(52) U.S. Cl.
USPC .......................................... 524/507; 427/387

(58) Field of Classification Search
None
See application file for complete search history.

(56) References Cited

U.S. PATENT DOCUMENTS

| | | | | |
|---|---|---|---|---|
| 5,182,174 | A * | 1/1993 | Stephenson | 428/450 |
| 5,250,605 | A * | 10/1993 | Hazan et al. | 524/504 |
| 5,532,027 | A * | 7/1996 | Nordstrom et al. | 427/493 |
| 6,379,807 | B1 * | 4/2002 | Nordstrom et al. | 428/447 |
| 6,653,394 | B1 * | 11/2003 | Meisenburg et al. | 524/589 |
| 2003/0139512 | A1 * | 7/2003 | Wegner et al. | 524/445 |
| 2006/0217472 | A1 * | 9/2006 | Staunton | 524/236 |
| 2007/0292623 | A1 * | 12/2007 | Lin | 427/407.1 |
| 2008/0041274 | A1 * | 2/2008 | Klein et al. | 106/287.25 |

* cited by examiner

*Primary Examiner* — Robert S Loewe
(74) *Attorney, Agent, or Firm* — Ingrassia Fisher & Lorenz, P.C.

(57) ABSTRACT

A crosslinked coating composition formed from polyurethane polyols and blocked or unblocked polyisocyanates. The polyisocyanates, in particular, comprise at least bis(isocyanatomethyl)cyclohexane. The coating is substantially free from ester functionality that forms a contiguous part of the network backbone. A clearcoat formed from the described components and having a majority of urethane bonds is very resistant to environmental etch damage.

18 Claims, No Drawings

ETCH RESISTANT CLEARCOAT

CROSS-REFERENCE TO RELATED APPLICATION

This application is a U.S. National-Stage entry under 35 U.S.C. § 371 based on International Application No. PCT/US2011/020661, filed Jan. 10, 2011, which was published under PCT Article 21(2) and which claims priority to U.S. Provisional Application No. 61/293,334, filed Jan. 8, 2010, which are all hereby incorporated in their entirety by reference.

FIELD OF THE DISCLOSURE

The field of the disclosure is related to coating compositions, especially clearcoat compositions that are resistant to acid rain etching. Particularly, the coating compositions comprise polyurethane polyols, a silane resin, silsesquioxane, and isocyanate crosslinkers.

BACKGROUND OF DISCLOSURE

The etching of painted surfaces that are exposed to environmental pollutants is a known problem. Acid rain is one of the main causes of this etching damage and can be seen as a gradual decrease in the gloss of the painted surface. Dark colored paints will often show this damage more readily than do lighter colored paints. In some cases, the damage can cause a surface to appear dull and hazy. To repair the damage, the surface must be buffed to remove the etched portions or the surface may need to be repainted.

The automotive paint industry is particularly concerned with this type of damage. Most automotive manufacturers have developed detailed procedures for determining the acid etch resistance of a paint. Before the automobile manufacturer will qualify a paint for use on its vehicles, it must pass a minimum level of acid etch resistance.

Today, most vehicles are coated with a paint system that comprises several layers of paint including a basecoat, which provides the color range of a painted vehicle, and a clearcoat that generally provides a high level of gloss and aesthetic value to the vehicles appearance. Such basecoat/clearcoat paints are applied in multiple layers. In a typical procedure, one or more layers of a basecoat composition are applied and subjected to a short drying period to remove at least a portion of the liquid carrier. One or more layers of a clearcoat composition can then be applied over the basecoat followed by a period of heat to dry and cure the applied layers of basecoat and clearcoat compositions.

The clearcoat composition is generally the outermost layers and is the most likely of the paint layers to be damaged by the effects of acid rain damage. Paint manufacturers have developed several types of paint formulations that are able to provide some resistance to acid rain damage. One commonly used paint formulation is that of an epoxy/acid clearcoat. In an epoxy acid clearcoat, the crosslinked network is formed by the reaction of epoxy groups with acid functional groups to form polyesters. One other commonly used clearcoat formulation is a silane clearcoat which adds silane functional groups to the crosslinkable and/or crosslinking components. Both of these approaches provide a higher level of resistance to acid rain than was available before their introduction. However, over time both of these types of clearcoats will show the effect of the action of acid rain.

It would be desirable for a clearcoat that has even higher levels of acid rain etch resistance than is currently available.

STATEMENT OF THE DISCLOSURE

The present disclosure is related to a coating composition comprising a crosslinkable component and a crosslinking component wherein the crosslinkable component comprises:
  (i) a polyurethane polyol;
  (ii) a silane resin;
  (iii) a silsesquioxane; and
wherein the crosslinking component is selected from the group consisting of bis(isocyanatomethyl)cyclohexane, an oligomer bis(isocyanatomethyl)cyclohexane and a combination thereof wherein the coating composition is a clearcoat composition.

The present disclosure is further related to a method of coating a substrate with the coating composition and to a substrate coated with a dried and cured layer of the coating composition.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

As used herein, the phrase "bis(isocyanatomethyl)cyclohexane" is used to describe a composition consisting of cis-1,3-bis(isocyanatomethyl)cyclohexane, trans-1,3-bis(isocyanatomethyl)cyclohexane, cis-1,4-bis(isocyanatomethyl)cyclohexane, trans-1,4-bis(isocyanatomethyl)cyclohexane or a combination thereof.

As used herein the phrase "oligomer of bis(isocyanatomethyl)cyclohexane" means an isocyanate condensation product of bis(isocyanatomethyl)cyclohexane. In some embodiments, the condensation products can be from the reaction of one isocyanate group with another. Such reactions tend to form polyisocyanates having carbodiimide, uretidione, isocyanurate and/or oxadiazinedione structures. In other embodiments, the oligomers of bis(isocyanatomethyl)cyclohexane can include, for example, condensation products from the reactions of the isocyanate groups with polyols and/or amine groups. Suitable polyols that can be used to produce the oligomers can include, for example, alkylene glycols, trimethylolpropane, trimethylol ethane, pentaerythritol, glycerol, ditrimethylol propane, dipentaerythritol, tetrakis (2-hydroxyethyl)methane, diglycerol, xylitol, sorbitol, sucrose or a combination thereof. Suitable amines can include, for example, ethylene diamine, propylene diamine, tetramethylene diamine, pentamethylene diamine, hexamethylene diamine, triethylene glycol diamine, ethylene diamine tetraamine, 1,4-bis(aminomethyl)benzene, 2,4-bis(aminomethyl)toluene, α,ω-diaminopolyethylene glycol, α,ω-diaminopolypropylene glycol or a combination thereof.

As used herein, the term "clearcoat" is meant to describe the appearance of one or more layers of the dried and cured clearcoat composition. The uncured clearcoat composition can be clear, translucent or opaque.

The term "film-forming binder" means the crosslinkable and crosslinking components that react with each other to form a crosslinked network. Additives such as solvents, pigments, stabilizers, rheology control agents, etc are not included in this definition unless they have functional groups that can react with one of the crosslinkable or crosslinking groups to form a part of the crosslinked network.

The disclosed coating compositions can comprise a crosslinkable component and a crosslinking component. Typically, the crosslinkable component can comprise compounds, oligomers and/or polymers having crosslinkable functionality. Suitable crosslinkable functional groups can include, for example, hydroxyl, primary amino, secondary amino, carboxylic acid, silane, siloxane, silsesquioxane or a combination thereof. In particular embodiments of the disclosure, the crosslinkable functional groups can comprise hydroxyl, silane and silsesquioxane functional groups or a combination thereof. The crosslinking component can comprise compounds, oligomers and/or polymers having, on average, two or more isocyanate functional groups, melamine resins, blocked isocyanates and a combination thereof. In particular embodiments of the disclosure, the crosslinking component comprises bis(isocyanatomethyl)cyclohexane. Optionally, one or more of the isocyanate functional groups can be blocked with blocking agents that deblock upon heating to regenerate the isocyanate functional groups.

It has been found that a coating composition comprising a crosslinkable component comprising or consisting essentially of (i) a polyurethane polyol; (ii) a silane resin; and iii) a silsesquioxane; and a crosslinking component comprising or consisting essentially of bis(isocyanatomethyl)cyclohexane, an oligomer of bis(isocyanatomethyl)cyclohexane, a blocked isocyanate derivative thereof or any combination thereof can be cured to form a clearcoat on a substrate that has excellent resistance to acid etch. In some embodiments, the crosslinkable component can comprise or consist essentially of in the range of from 10 to 55 percent of the polyurethane polyol, in the range of from 20 to 80 percent silane resin, and in the range of from 10 to 70 percent silsesquioxane. In other embodiments, the crosslinkable component can comprise or consist essentially of in the range of from 15 to 35 percent of the polyurethane polyol, in the range of from 25 to 70 percent silane resin, and in the range of from 15 to 60 percent silsesquioxane. All percentages are percent by weight based on the total amount of crosslinkable component.

The polyurethane polyols can comprise one or more compounds, oligomers or polymers having both hydroxyl functional groups and urethane (—N(H)—C(O)—O—) groups. Suitable polyurethane polyols are known in the art and can be formed using a variety of methods. The term "polyurethane polyol" is used herein to describe a molecule having in the range of from 2 to 100 hydroxyl functional groups and also having in the range of from 1 to 100 urethane groups.

Suitable polyurethane polyols can include, for example, commercially available polyurethane polyols, for example, K-FLEX® urethane diols, available from King Industries, Norwalk, Conn. Other examples of polyurethane polyols are known in the art and in some embodiments, can be produced according to known methods, for example, by the reaction of a polyisocyanate with a polyol having at least two hydroxyl groups for every isocyanate group; or by the reaction of a polyamine with one equivalent of cyclic carbonate for every one equivalent of amine.

In some embodiments, the polyurethane polyols can be produced by the reaction of a polyisocyanate with a polyol. The stoichiometry of the reaction can be selected so that the ratio of isocyanate functional groups to hydroxyl functional groups (NCO:OH) is in the range of from 1:2 to 1:20. While the upper limit of NCO:OH is said to be 1:20, it can be possible to use higher amounts of hydroxyl functional groups. However, as the concentration of urethane functional groups in the polyurethane polyol decreases, it can be possible that the etch resistance also decreases. In another embodiment, suitable polyurethane polyols can include the reaction of a polyisocyanate with a polyol, such as, for example, the reaction of one mole of the isocyanurate trimer of 1,6-hexamethylene diisocyanate with three moles of 2,2-dibutyl-1,3-propanediol.

Polyols suitable for producing the polyurethane polyol can include, for example, ethylene glycol, 1,2-propane diol, 1,3-propane diol, 2,2-dibutyl-1,3-propanediol, trimethylolpropane, trimethylol ethane, pentaerythritol, glycerol, ditrimethylol propane, dipentaerythritol, tetrakis (2-hydroxyethyl) methane, diglycerol, xylitol, sorbitol, sucrose, polyether polyols, polyester polyols or a combination thereof.

Suitable polyisocyanates can include, for example, 1,6-hexamethylene diisocyanate, isophorone diisocyanate, trimethylene diisocyanate, 1,4-tetramethylene diisocyanate, 2,3-tetramethylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, bis(isocyanatomethyl)cyclohexane, 4-methyl-1,3-diisocyanatocyclohexane, dicyclohexylmethane-4,4'-diisocyanate, 3,3'-dimethyl-dicyclohexylmethane 4,4'-diisocyanate, 2,4-toluene diisocyanate, 2,6-toluene diisocyanate, 4,4'-diphenylmethane diisocyanate, 3,3'-dimethyl-4,4'-biphenyl diisocyanate, 1,4-benzene diisocyanate, 1,5-naphthalene diisocyanate, 4,6-xylene diisocyanate, oligomers of any of the above listed polyisocyanates having isocyanurate structural units, uretidione structural units, allophanate structural units, biuret structural units or a combination thereof. While polyisocyanates having the isocyanate functional group bonded directly to an aromatic group can be used, coating compositions containing such groups tend to yellow over time, which can limit their usefulness as clearcoats. Therefore, the use of such aromatic isocyanates should be limited when the coating composition is to be used as a clearcoat.

In some embodiments, branched polyester polyols can be used as the polyol for producing the polyurethane polyol. Some suitable examples of branched polyester polyols can comprise or consist essentially of the reaction product of;

a) the range of from 20 to 80 percent by weight of one or more monofunctional carboxylic acid monomers having 2 to 17 carbon atoms;

b) in the range of from 10 to 40 percent by weight of one or more hydroxyl functional monomers having a hydroxyl functionality of 3 to 10; and c) in the range of from 10 to 40 percent by weight of one or more polycarboxylic acid monomers;

wherein all percentages by weight are based on the total amount of monomers used to make the branched polyester polyol. It can be possible to use 1 to 4 carbon atom ester derivatives of any of the carboxylic acid functional monomers. In some embodiments, diols can replace a portion of the hydroxyl functional monomers having a hydroxyl functionality of 3 to 10.

Suitable monofunctional carboxylic acid monomers can include, for example, acetic acid, propionic acid, butyric acid, 2,2-dimethyl propionic acid, pentanoic acid, hexanoic acid, isononanoic acid, oleic acid, decanoic acid, 2-cyclohexyl acetic acid, 2,2-dimethyl pentanoic acid, methyl cyclohexanoic acid, octanoic acid, nonanoic acid or a combination thereof.

Suitable hydroxyl functional monomers having a hydroxyl functionality of 3 to 10 can include, for example, trimethylol propane, trimethylol ethane, pentaerythritol, glycerol, ditrimethylol propane, dipentaerythritol, tetrakis (2-hydroxyethyl)methane, diglycerol, xylitol, sorbitol, sucrose or a combination thereof.

A third monomer that can be used to form the branched polyester polyol is a polycarboxylic acid monomer or an ester derivative thereof. As used herein, the term "polycarboxylic acid monomer" is meant to encompass a molecule that has in the range of from 2 to 10 carboxylic acid functional groups per molecule, an anhydride functional molecule having in the range of from 1 to 5 anhydride groups per molecule, a ester derivative of the carboxylic acid or anhydride and a combination thereof. In some embodiments, the polycarboxylic acid can be a dicarboxylic acid. In more specific embodiments, the polycarboxylic acid monomers can be chosen from the group consisting of hexahydrophthalic anhydride, methyl hexahydrophthalic anhydride, alkyl hexahydrophthalic anhydride, maleic acid, fumaric acid, succinic acid, hexahydrophthalic acid, alkyl hexahydrophthalic acid, tetrahydrophthalic acid, alkyl tetrahydrophthalic acid, adipic acid, glutaric acid, malonic acid, azelaic acid, sebacic acid, dodecanoic acid, maleic anhydride, succinic anhydride, tetrahydrophthalic anhydride, methyl tetrahydrophthalic anhydride, alkyl tetrahydrophthalic anhydrides, adipic anhydride, glutaric anhydride or a combination thereof.

In some embodiments, the hydroxyl number of the branched polyester polyol can be in the range of from 150 to 300 mg KOH/g product and the acid number can be in the range of from 1 to 40 mg KOH/g product and the branched polyester polyol can have a weight average molecular weight in the range of from 1,000 to 100,000. Polyester preparation techniques are well known in the art and will not be discussed herein.

The branched polyester polyol can then be reacted with any of the previously mentioned polyisocyanates to form the polyurethane polyol crosslinkable component.

In other embodiments, the polyurethane polyols can also be produced via the reaction of a cyclic carbonate with a polyamine. Suitable examples of this reaction can include, for example, the reaction of propylene carbonate with 2-butyl-2-ethyl-1,5-pentanediamine or the reaction of ethylene carbonate with α,ω-diaminopolyether.

In some embodiments, suitable cyclic carbonates can have a structure according to formula (I);

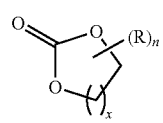
(I)

wherein R is an alkyl group comprising in the range of from 1 to 10 carbon atoms optionally substituted with one or more of a halogen, hydroxyl, thiol, silane siloxane group; x is an integer selected from the group consisting of 1, 2, 3, or 4; and n is an integer in the range of from 0 to 2x+2. In some embodiments, the structure of formula (I) can include ethylene carbonate, wherein x=1 and n=0, and propylene carbonate wherein x=1, n=1 and R is methyl.

In some embodiments, suitable polyamines can be linear or branched aliphatic amines containing in the range of from 2 to 10 primary and/or secondary amines and in the range of from 2 to 50 carbon atoms or the amines can be cycloaliphatic or aromatic amines containing in the range of from 2 to 10 primary and/or secondary amines and in the range of from 3 to 20 carbon atoms for cycloaliphatic amines and in the range of from 6 to 20 carbon atoms for aromatic amines. In some embodiments, the polyamines can include, for example, ethylene diamine, propylene diamine, tetramethylenediamine, pentamethylenediamine, hexamethylenediamine, triethylene glycol diamine, ethylene diamine tetraamine, 1,4-bis(aminomethyl)benzene, 2,4-bis(aminomethyl)toluene, α,ω-diaminopolyethylene glycol, α,ω-diaminopolypropylene glycol, or a combination thereof. Aromatic amines can be used, however, such amines tend to yellow over time, which can lessen their usefulness in a clearcoat composition.

The crosslinkable component can also comprise a silane resin. Suitable silane resins can be formed from the polymerization of various (meth)acrylic monomers. The (meth)acrylic monomers can include silane functional monomers as well as monomers that do not have silane functional groups. Silane functional (meth)acrylic monomers can include, for example, gamma-acryloxypropyl trimethoxysilane, gamma-methacryloxypropyl trimethoxysilane, gamma-methacryloxypropyltris(2-methoxyethoxy) silane or a combination thereof. Other suitable silane monomers can include those monomers that have a structure according to;

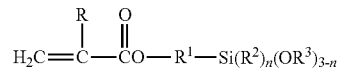

wherein R is H or $CH_3$, $R^1$ is a linear or branched alkyl group having from 1 to 6 carbon atoms, each $R^2$ is independently a linear or branched alkyl group having from 1 to 4 carbon atoms and each $R^3$ is independently a linear or branched alkyl having from 1 to 4 carbon atoms, and n is 0, 1 or 2. In still further embodiments, the silane functional monomer can include monomers having a structure according to;

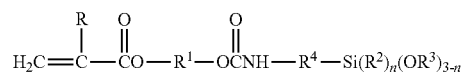

wherein R is H or CH3, $R^1$ is a linear or branched alkyl group having from 1 to 6 carbon atoms, each $R^2$ is independently a linear or branched alkyl group having from 1 to 4 carbon atoms and each $R^3$ is independently a linear or branched alkyl having from 1 to 4 carbon atoms. $R^4$ is a linear or branched alkyl group having from 1 to 6 carbon atoms, and n is 0, 1 or 2

The silane resin can also be formed using monomers that do not have a silane functional group. Such monomers can include, for example, methyl methacrylate, ethyl methacrylate, propyl methacrylate, butyl methacrylate, isobutyl methacrylate, pentyl methacrylate, hexyl methacrylate, actyl methacrylate, nonyl methacrylate, lauryl methacrylate, methyl acrylate, ethyl acrylate, propyl acrylate, butyl acrylate, isobutyl acrylate, pentyl acrylate, hexyl acrylate, actyl acrylate, nonyl acrylate, lauryl acrylate, trimethylcyclohexyl methacrylate, trimethylcyclohexyl acrylate, isobornyl methacrylate, isobornyl acrylate, t-butyl cyclohexyl acrylate, t-butyl cyclohexyl methacrylate, hydroxyl methyl acrylate, hydroxyl methyl methacrylate, hydroxyl ethyl acrylate, hydroxyl ethyl methacrylate, hydroxyl propyl methacrylate, hydroxyl propyl acrylate, hydroxyl butyl acrylate, hydroxyl butyl methacrylate, styrene, methyl styrene, acrylamide, acrylonitrile, methacrylonitrile or a combination thereof.

In some embodiments, the silane resin can comprises or consist essentially of in the range of from 5 to 80 percent of silane functional monomers, in the range of from 10 to 40 percent of hydroxyl functional monomers and the remainder of the monomers are monomers that do not have silane or hydroxyl functional groups. In other embodiments, the silane resin can comprise or consist essentially of in the range of from 10 to 60 percent of silane functional monomers, in the range of from 15 to 35 percent of hydroxyl functional monomers, and the remainder of the monomers are monomers that do not have silane or hydroxyl functional groups; and in still further embodiments, the silane resin can comprise or consist essentially of in the range of from 15 to 40 percent by weight of silane functional monomers, in the range of from 20 to 30 percent of hydroxyl functional monomers, and the remainder of the monomers are monomers that do not have silane or hydroxyl functional groups. All percentages by weight are based on the total amount of monomers that make up the silane resin.

The crosslinkable component can also comprise silsesquioxane. A silsesquioxane is a compound that can have an empirical formula of $RSiO_{1.5}$, wherein each R is independently H, an alkyl group having in the range of from 1 to 6 carbon atoms, an aromatic group having in the range of from 6 to 20 carbon atoms, a hydrolyzable group or a combination thereof. In some embodiments, the silsesquioxane can include, for example, one or more of the structures;

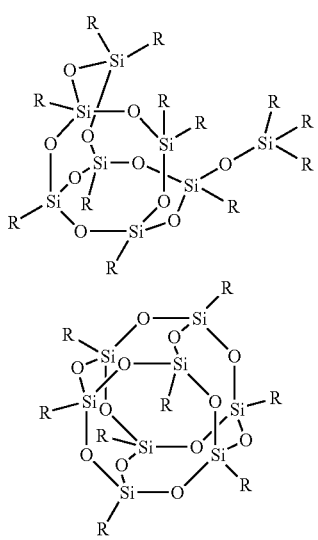

The above structures are just two of many possible silsesquioxanes that can be used. A combination of silsesquioxanes having various structures can also be used. In some embodiments, the silsesquioxane can have, on average, greater than 1.1 hydolyzable groups per molecule. Silsesquioxanes containing hydrolyzable R groups help to ensure that the silses-quioxane molecule becomes crosslinked into the final network of the cured coating composition. Suitable hydrolysable groups can include, for example, alkoxy groups, amine groups, heterocyclic groups or a combination thereof.

In some embodiments, it can be important to produce the coating composition that is free from or essentially free from microgels or non-aqueous dispersions. Microgels and non-aqueous dispersions are well known in the art and in some cases can adversely affect the acid etch resistance of a coating composition. Therefore, in some embodiments, the disclosed coating compositions are free from both of the microgel and non-aqueous dispersions and, in other embodiments, the coating compositions are essentially free from both of the microgel and non-aqueous dispersions. As used herein, the phrase "essentially free from" means that a composition contains less than 1 percent by weight of a particular component, based on the total weight of the composition.

In some embodiments, the crosslinking component can comprise or consist essentially of in the range of from 20 percent to 100 percent by weight, based on the total weight of the crosslinking component of bis(isocyanatomethyl)cyclohexane, an oligomer bis(isocyanatomethyl)cyclohexane, a blocked isocyanate derivative thereof or a combination thereof. In some embodiments, the crosslinking component can comprise in the range of 0 percent to 80 percent of other crosslinking agents that are different from the bis(isocyanatomethyl)cyclohexanes. In other embodiments, the crosslinking component can contain in the range of from 25 to 95 percent by weight of bis(isocyanatomethyl)cyclohexane, an oligomer of bis(isocyanatomethyl)cyclohexane, a blocked isocyanate derivative thereof or a combination thereof and in the range of from 5 to 75 percent by weight of other crosslinking agents, and in still further embodiments, the crosslinking component can contain in the range of from 30 to 90 percent by weight of bis(isocyanatomethyl)cyclohexane, an oligomer of bis(isocyanatomethyl)cyclohexane, a blocked isocyanate derivative thereof or a combination thereof and in the range of from 10 to 70 percent of other crosslinking agents.

The other crosslinking agents can be chosen from the group selected from melamines, polyisocyanates other than the bis(isocyanatomethyl)cyclohexanes or a combination thereof. The polyisocyanate crosslinking components can be blocked or unblocked. Suitable melamines include, for example, monomeric melamines, polymeric melamines or a combination thereof. Cytec Industries Inc., of West Patterson, N.J. supplies a variety of monomeric and polymeric melamines under the CYMEL® tradename.

Suitable other polyisocyanates, if present, can include, for example, any of the previously mentioned aliphatic polyisocyanates, cycloaliphatic polyisocyanates, aromatic polyisocyanates, and polyisocyanate adducts. If the coating composition is to be used as a clearcoat composition, then it is preferable that the amount of aromatic isocyanates be kept as low as possible. In some embodiments, the coating composition can be free from aromatic isocyanates.

The isocyanate groups of the required bis(isocyanatomethyl)cyclohexane and any of the other polyisocyanates that may be present can comprise free isocyanate groups or the isocyanate groups can be blocked. In some embodiments, the isocyanate groups can be blocked with, for example, alcohols, phenols, oximes, heterocyclic compounds, amino alcohols or a combination thereof. Suitable blocking agents for isocyanate groups include; (monohydric) alcohols, for example, methanol, ethanol, 2-ethyl-1-hexanol, 2-propyl-1-heptanol and the various isomers of propanol, butanol, hexanol, heptanal, octanol, nonanol, decanol; unsaturated alcohols such as, for example, propargyl alcohol or allyl alcohols;

cycloaliphatic alcohols such as, for example, cyclopentanol, cyclohexanol, cyclohexylmethanol; alkylaromatic alcohols such as, for example, benzyl alcohol, p-methyl-, p-methoxy- and p-nitrobenzyl alcohol; and monoether glycols such as, for example, ethylene glycol monomethyl ether, ethylene glycol monobutyl ether. Further useful blocking agents are, for example, phenol; oximes, with 3 to 20 carbon atoms, preferably 3 to 10 carbon atoms, such as, for example, acetone oxime, methyl ethyl ketone oxime, methyl butyl ketone oxime, methyl n-amyl ketone oxime, octanone oxime and cyclohexanone oxime; alkyl malonates; acetoacetic esters; cyanoacetic esters; NH-acidic compounds such as caprolactam; heterocyclic compounds, such as, for example, pyrazole, methyl pyrazole and dimethylpyrazole; and amino alcohols such as diethylethanolamine.

The coating composition can further comprise various additives. Suitable additives can include one or more of, for example, organic solvent, catalysts, light stabilizers, antioxidants, rheology control agents, slip additives, defoamers, emulsifiers, film forming auxiliaries, fillers or a combination thereof.

Suitable organic solvents can include, for example, aromatic hydrocarbons, such as, for example, petroleum naphtha or xylenes; ketones, such as, for example, methyl amyl ketone, methyl isobutyl ketone, methyl ethyl ketone or acetone; esters, such as, for example, butyl acetate or hexyl acetate; and glycol ether esters, such as, for example, propylene glycol monomethyl ether acetate. The amount of organic solvent added depends upon the desired solids level as well as the desired amount of volatile organic content (VOC) of the composition.

In some embodiments, the coating composition can include one or more catalysts to enhance crosslinking of the components on curing. Some suitable catalysts can include, for example, dialkyl tin diesters; lead octoate; ferric acetoacetonate; bismuth carboxylates; aromatic acid catalysts, such as, for example, dodecylbenzene sulfonic add, para-toluenesulfonic acid, dinonylnaphthalene sulfonic add, phosphoric acids, phenyl add phosphate or a combination thereof. The acid catalysts can be free acids or they can be blocked with an amine, such as, for example, dimethyl oxazolidine, 2-amino-2-methyl-1-propanol or a combination thereof.

In some embodiments, the coating composition can include one or more catalyst in the range of from 0.001 percent to 5 percent by weight, based on the total weight of the film forming binder. In other embodiments, the catalysts can comprise in the range of from 0.1 to 2 percent by weight, based on the total weight of the film forming binder. In still further embodiments, the coating composition can include in the range of from 0.5 percent to 2 percent by weight, based on the total weight of film forming binder.

To improve weatherability of a dried and cured layer of the coating composition, one or more light stabilizers can be added. The light stabilizer can be added in an amount in the range of from 0.1 to 5 percent by weight, based on the total weight of the film forming binder. These stabilizers include ultraviolet (UV) light absorbers, screeners, quenchers and hindered amine light stabilizers. Suitable light stabilizers can include, for example, bis(2,2,6,6-tetramethylpiperidinyl)sebacate, bis(N-methyl-2,2,6,6-tetramethylpiperidinyl)sebacate, bis(N-octyloxy-2,2,6,6-tetramethylpiperidynyl)sebacate. Combinations of ultraviolet light absorbers and hindered amine light stabilizers can be included, for example, bis(N-octyloxy-2,2,6,6-tetramethylpiperidynyl)sebacate, and benzenepropionic acid, 3-(2H-benzotriazol-2-yl)-5-(1,1-dimethylethyl)-4-hydroxy-,C7-9-branched alkyl esters. Another useful combination can include, for example, 2-(3', 5'-bis(1-methyl-1-phenylethyl)-2'-hydroxyphenyl)benzotriazole and decanedioc acid, bis(2,2,6,6,-tetramethyl-4-piperidinyl)ester both supplied by Ciba Specialty Chemicals of Tarrytown, N.Y. under the TINUVIN® light stabilizer trademark.

Also, in the range of from 0.1 to 5 percent by weight, based on the total weight of the film forming binder, of an antioxidant can be added. Suitable antioxidants include, for example, hydroxydodecyl benzophenone, 2,4-dihydroxybenzophenone; triazoles, for example, 2-phenyl-4-(2'-4'-dihydroxybenzoyl)triazole; 2-(benzotriazole-2-yl)-4,6-bis (methylethyl-1-phenyl ethyl)phenol, 2-(3-hydroxy-3,5'-ditert amyl phenyl) benzotriazole, 2-(3',5'-bis(1,1-dimethylpropyl)-2'-hydroxyphenyl)-2H-benzotriazole, benzenepropanoic acid, 3-(2H-benzotriazol-2-yl)-5-(1,1-dimethylethyl)-4-hydroxy-C7-C9-branched alkyl esters and 2-(3',5'-bis(1-methyl-1-phenylethyl)-2'-hydroxyphenyl) benzotriazole.

Other additives that can be used in a coating composition are known in the art. Suitable additives can include, for example, slip additives; polymerization inhibitors; defoamers; emulsifiers, for example nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols; wetting agents; adhesion promoters; leveling agents; film forming auxiliaries such as cellulose derivatives; transparent fillers such as nanoparticles based on silicon dioxide, aluminum oxide or zirconium oxide; inorganic phyllosilicates such as aluminum magnesium silicates, sodium magnesium phyllosilicates and sodium magnesium fluorine lithium phyllosilicates of the montmorillonite type; flame retardants, flattening agents or a combination thereof.

While the coating composition described herein is especially useful for an etch resistant clearcoat, if desired, the composition can be pigmented to form a colored mono coat, a basecoat, or a primer. Generally, 0.1% to 200% by weight, based on the total weight of the crosslinkable and crosslinking components, of conventional pigments can be added using conventional techniques, such as sand-grinding, ball milling, attritor grinding, two roll milling to disperse the pigments. The dispersed pigment can be blended with the film-forming constituents. The pigment component of this disclosure may be any of the generally well-known pigments or mixtures thereof used in coating formulations, as reported, e.g., in Pigment Handbook, T. C. Patton, Ed., Wiley-Interscience, New York, 1973. Any of the conventional pigments used in coating compositions can be utilized in the composition such as the following: metallic oxides, such as titanium dioxide, zinc oxide, and iron oxide, metal hydroxide, metal flakes, such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired chromate-free pigments, such as barium metaborate, zinc phosphate, aluminum triphosphate and mixtures thereof, can also be used.

The coating composition of the present disclosure can be formulated as primer, a basecoat or a clearcoat composition. It can be formulated as a one-pack coating composition or a two-pack coating composition. One-pack coating compositions are typically used by an industrial/automotive Original Equipment Manufacturer (OEM) where the work piece can be subjected to high baking temperatures needed to cure the paint and two-pack coating compositions are typically used in automotive Refinish shops or in other manufacturing settings where the work piece cannot be subject to high baking temperatures. The application of the coating composition will be described in terms of applying a clearcoat to a substrate. In some embodiments, the method of applying the coating composition to a substrate comprises or consists essentially of;

1) applying a layer of the composition to the substrate; and
2) curing the applied coating composition. The coating composition can be applied over one or more layers of a previously applied basecoat composition. The previously applied basecoat composition can be dried and cured or the layer of clearcoat composition can be applied to a one or more layers of basecoat composition that have not been dried and/or cured. Applying a layer of clearcoat composition to a wet layer of basecoat composition is called a wet-on-wet process and is common in the art.

A one-pack coating composition typically comprises a crosslinking component wherein the isocyanate groups are blocked. Application of the coating composition can be by conventional techniques, such as, spraying, electrostatic spraying, roller coating, dipping or brushing. The applied layer of coating composition is optionally flash-dried to remove at least a portion of the solvent. In some embodiments, the applied layer of coating composition can be cured at a temperature in the range of from 80° C. to 200° C., for 10 to 60 minutes. In other embodiments, the applied layer of coating composition can be cured at a temperature in the range of from 80° C. to 160° C., for 10 to 60 minutes.

When the crosslinking component comprises isocyanate groups, the coating compositions can be formulated as a two-pack coating composition. One pack of the coating composition comprises the crosslinkable components while the second pack comprises the crosslinking components. The two packs can be mixed just prior to use to form a potmix. One or more layers of the potmix can be applied to the substrate by conventional techniques, such as, spraying, electrostatic spraying, roller coating, dipping or brushing. The applied layer of coating composition can optionally be flash-dried to remove at least a portion of the solvent. The applied layer of coating composition can be dried and cured at ambient temperatures or can be baked upon application for 10 to 60 minutes at baking temperatures ranging from 30° C. to 160° C.

Another embodiment is a substrate coated by a dried and cured layer of the coating composition. The coating composition can be applied to a substrate using any of the known methods. Suitable methods include, for example, spraying, electrostatic spraying, roller coating, dipping or brushing. When used as a clearcoat, the composition can be applied to a basecoat prior to the basecoat being cured. For example, a layer or layers of a basecoat can be applied to a suitable substrate. The applied basecoat can be subjected to a short drying step that removes at least a portion of the solvent without crosslinking the composition. One or more layers of a clearcoat composition according to the present disclosure can then be applied over top of the basecoat, followed by an optional drying step wherein at least a portion of the solvent is removed. The combined multilayer composition can then be cured. Typically, one-pack coating compositions are cured at elevated temperatures, and two-pack coating compositions can be cured at ambient temperatures or they can be cured at elevated temperatures.

Suitable substrates for applying the coating composition of the present disclosure include automobile bodies, any and all items manufactured and painted by automobile sub-suppliers, frame rails, commercial trucks and truck bodies, such as, for example, beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft. The substrate can further include industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

EXAMPLES

The present disclosure is further defined in the following Examples. It should be understood that these Examples, while indicating preferred embodiments of the disclosure, are given by way of illustration only. From the above discussion and these Examples, one skilled in the art can ascertain the essential characteristics of this disclosure, and without departing from the spirit and scope thereof, can make various changes and modifications of the disclosure to adapt it to various uses and conditions.

Unless otherwise noted, all ingredients are available from the Aldrich Chemical Company, Milwaukee, Wis.

DESMODUR® VPLS 2253 is available from Bayer Materials Science, Pittsburgh, Pa.

Preparation of Branched Polyester Prepolymer

A mixture of 45.04 parts of isononanoic acid, 0.46 parts of anti-yellowing agent, 20.34 parts of hexahydrophthalic anhydride, 29.89 parts of pentaerythritol and 4.25 parts of xylene were stirred at reflux until an acid number of 22 mg KOH/g resin was reached. The resulting mixture was then cooled 90° C. and was filtered through a 25 µm filter. The resulting polyester had a hydroxyl value of 235 mg KOH/g solid resin, a solids content of 95% and an acid value of 22 mg KOH/g resin and a Gardner number of W-X at 80 percent solids in xylene.

Preparation of Polyester Urethane

To a reaction vessel equipped with a dropping funnel and a nitrogen inlet was added 56.46 parts of the branched polyester prepolymer of example 1, 16.09 parts of SOLVESSO® 100 and 17.32 parts of methoxy isopropyl acetate. The mixture was heated to 70° C. 8.36 parts of 1,6-hexamethylene diisocyanate (49.8 percent NCO) was added to the dropping funnel was added over a 25 minute period. 176 parts of SOLVESSO® 100 was added to rinse the dropping funnel into the reaction. The mixture was heated to 100° C. and stirred at 100° C. until the residual isocyanate content reached 0%, approximately 3 hours (NCO measurement was carried out by reacting the isocyanate with an excess of dibutylamine followed by titration with HCl 0.5N). The resulting polyester urethane was cooled to 70° C. and was filtered through a 25 µm filter. The polymer had a hydroxyl value of 100 mg KOH/g solid resin, a solids content of 62, an acid value of 20 mg KOH/g resin, a Gardner color number of 1, a Gardner viscosity of U.

Preparation of Silicone Leveling Agent

A mixture of 192 parts by weight of BYK® 320 silicon leveling additive was stirred in 98.08 parts by weight of xylene mix for one hour. The mixture was used as is.

Preparation of Silane Resin

To a 3-liter glass flask equipped with an agitator, thermometer, water condenser, and heating mantle was added 124.8 grams of SOLVESSO® 100 and 962 grams n-butyl alcohol. This mixture was agitated and heated to reflux. While maintaining the batch at reflux, a monomer mixture consisting of 103 grams styrene, 30.9 grams n-butyl acrylate, 103 grams hydroxyl propyl acrylate, 123.6 grams isobutyl methacrylate and 669.2 grams gamma-methacryloxypropyl trimethoxy silane was added to the reactor over a 300 minute period. An initiator mixture consisting of 82.0 grams VAZO® 67 and 157.5 grams SOLVESSO® 100 were added over 330 minutes simultaneously with the monomer mixture. After completion of the monomer and initiator feeds, the reaction mixture was held at reflux for an additional 60 minutes, allowed to cool to room temperature and was used as is. The weight solids of the resulting polymer solution was 71.3% and the Gardner-Holdt viscosity measured at 25° C. was 0. Number average molecular weight of the polymer was 3200 and polydispersity was 1.9, determined by GPC using polystyrene standards.

Preparation of Silsesquioxane

A mixture of 75 parts by weight of Dow Corning® Z-6018 reactive silicon intermediate was stirred with 25 parts by weight of butyl acetate at 37.8° C. for one hour until a solution formed. The mixture was used as is.

Preparation of UV package

A mixture of 75 parts by weight of SOLVESSO® 100, 8.5 parts by weight of TINUVIN® 123 and 16.5 parts by weight of TINUVIN® 928 was stirred. The mixture was used as is.

Coating Compositions

The following clearcoat compositions were prepared.

| Ingredient | COATING A | COMPARATIVE COATING B | Binder weight percentage |
|---|---|---|---|
| Butanol | 48.00 | 48.00 | |
| UV package | 44.8 | 44.8 | |
| DDBSA | 8.00 | 8.00 | |
| DESMODUR ® VPLS solution | 137.28 | 0 | 23.0 |
| DESMODUR ® PL340 | 0 | 171.6 | 23.0 |
| Polyester urethane | 114.80 | 114.80 | 17.0 |
| dibutyl tin dilaurate | 1.20 | 1.20 | |
| DISPARALON ® LC955 | 2.08 | 2.08 | |
| Silicone leveling agent | 5.18 | 5.18 | |
| Xylene | 23.50 | 23.50 | |
| SOLVESSO ® 150 | 29.70 | 29.70 | |
| butyl acetate | 35.64 | 35.64 | |
| Silane resin | 240.00 | 240.00 | 40.0 |
| Silsesquioxane | 112.00 | 112.00 | 20.0 |

Coating A and Comparative Coating B contain the same ingredients in the same weight percentages, with the exception that Coating A comprises a blocked version of the disclosed bis(isocyanatomethyl)cyclohexane while Comparative Coating B comprises a blocked polyisocyanate based on isophorone, diisocyanate.

To test the coating compositions, each of the compositions were formulated and were applied to steel panels which were prepared by coating the steel panels with a layer of COR-MAX® 6 electrocoat primer, available from DuPont, Wilmington, Del., and curing the applied composition. The panel was then coated with a layer of primer composition, Titanium Primer 708A01244, available from DuPont, Wilmington, Del. The primed panel was flashed for 10 minutes at ambient temperature and cured in a drying oven at 140° C. for 30 minutes. The panel was then cooled to ambient temperature. A layer of Ebony Black, 648S42728, available from DuPont, Wilmington, Del., was applied to the panel. The panel was flashed at ambient temperature for 3 minutes. One layer of the clearcoat composition was spray applied to each panel followed by a three minute flash time at ambient temperature. A second layer of the clearcoat composition was applied followed by a 5 minute flash at ambient temperature. The panels were then baked for 20 minutes in an oven at 140° C. metal temperature in a vertical position. The panels were removed from the oven and cooled to room temperature and tested for acid etch resistance.

To test the acid etch resistance of the cured clearcoat compositions, the panels were placed in a Byk Gradient oven. The temperature range of the gradient oven was set at 40° C. at the low end and 90° C. at the high end. Five drops of 40% aqueous sulfuric acid by weight was placed on each of the panels 11 times (from 40° C. up to 90° C.) and the panels were placed in the oven at 5° C. intervals and were held in the oven for 30 minutes. The panels were then removed from the oven and the acid was removed from each panel by rinsing with water. The temperature at which damage to the clearcoat composition became visible was noted. The results can be see in the table below. For comparison purposes, two commercial clearcoats, an epoxy acid clearcoat available from Kino, and an acrylosilane clearcoat, GEN IV® clearcoat available from DuPont were also tested.

TABLE 1

| | COATING A | COMPARATIVE COATING B | Epoxy Acid clearcoat | GEN IV ® clearcoat |
|---|---|---|---|---|
| Temperature of attack using 40% aqueous sulfuric acid | 85° C. | 65° C. | 80° C. | 55° C. |

The results show that a clearcoat according to the disclosure provides significantly better acid etch protection than the comparative coating and a commercially available etch resistant clearcoat (GEN IV®) and provide better resistance than an epoxy acid clearcoat.

What is claimed is:

1. A coating composition comprising a crosslinkable component and a crosslinking component wherein the crosslinkable component comprises:
   (i) a polyurethane polyol;
   (ii) a silane resin;
   (iii) a silsesquioxane; and
   wherein the crosslinking component is selected from the group consisting of bis(isocyanatomethyl)cyclohexane, an oligomer of bis(isocyanatomethyl)cyclohexane and a combination thereof wherein the coating composition is a clearcoat composition.

2. The coating composition of claim 1 wherein said crosslinking component further comprises melamines.

3. The coating composition of claim 1 wherein the crosslinkable component comprises in the range of from 10 to 55 percent by weight of the polyurethane polyol, in the range of from 20 to 80 percent by weight silane resin, and in the range of from 10 to 70 percent by weight silsesquioxane, wherein the percents by weight are based on the total amount of crosslinkable component.

4. The coating composition of claim 1 wherein the isocyanate groups are blocked with a blocking agent and said blocking agents are selected from the group consisting of alcohols, phenols, oximes, heterocyclic compounds and a combination thereof.

5. The coating composition of claim 1 wherein the polyurethane polyol is the product of a branched polyester polyol and a polyisocyanate.

6. The coating composition of claim 5 wherein the branched polyester polyol is the reaction product of;
   a) in the range of from 20 to 80 percent by weight of one or more monofunctional carboxylic acid monomers having 2 to 17 carbon atoms;
   b) in the range of from 10 to 40 percent by weight of one or more hydroxyl functional monomers having a hydroxyl functionality of 3 to 10; and
   c) in the range of from 10 to 40 percent by weight of one or more polycarboxylic acid monomers; and
wherein all percentages by weight are based on the total amount of monomers used to make the branched polyester polyol.

7. A method of coating a substrate said method comprising the steps of;
   1) applying a layer of a coating composition to the substrate; and
   2) curing the applied coating composition;
wherein said coating composition comprises a crosslinkable component and a crosslinking component, and wherein the crosslinkable component comprises:
   (i) a silane resin;
   (ii) a silsesquioxane;
   (iii) a polyurethane polyol; and
wherein the crosslinking component comprises a crosslinking agent selected from the group consisting of bis(isocyanatomethyl)cyclohexane, an oligomer of bis(isocyanatomethyl)cyclohexane and a combination thereof.

8. The method of claim 7 wherein the crosslinking component further comprises melamines.

9. The method of claim 7 wherein the crosslinkable component comprises in the range of from 10 to 55 percent by weight of the polyurethane polyol, in the range of from 20 to 80 percent by weight silane resin, and in the range of from 10 to 70 percent by weight silsesquioxane, wherein the percents by weight are based on the total amount of crosslinkable component.

10. The method of claim 7 wherein the isocyanate groups are blocked with a blocking agent and said blocking agents are selected from the group consisting of alcohols, phenols, oximes, heterocyclic compounds and a combination thereof.

11. The method of claim 7 wherein the polyurethane polyol is the product of a branched polyester polyol and a polyisocyanate.

12. The method of claim 7 wherein the branched polyester polyol is the reaction product of;
   a) in the range of from 20 to 80 percent by weight of one or more monofunctional carboxylic acid monomers having 2 to 17 carbon atoms;
   b) in the range of from 10 to 40 percent by weight of one or more hydroxyl functional monomers having a hydroxyl functionality of 3 to 10; and
   c) in the range of from 10 to 40 percent by weight of one or more polycarboxylic acid monomers; and
wherein all percentages by weight are based on the total amount of monomers used to make the branched polyester polyol.

13. A substrate coated by a layer of a dried and cured coating composition wherein the coating composition comprises a crosslinkable component and a crosslinking component wherein the crosslinkable component comprises:
   (i) a polyurethane polyol;
   (ii) a silane resin;
   (iii) a silsesquioxane; and
wherein the crosslinking component comprises a crosslinking agent selected from the group consisting of bis(isocyanatomethyl)cyclohexane, an oligomer of bis(isocyanatomethyl)cyclohexane and a combination thereof.

14. The substrate of claim 13 wherein the crosslinkable component comprises is the range of from 10 to 55 percent of the polyurethane polyol, in the range of from 20 to 80 percent silane resin, and in the range of from 10 to 70 percent silsesquioxane.

15. The substrate of claim 13 wherein the crosslinking component further comprises melamines.

16. The substrate of claim 13 wherein the isocyanate groups are blocked with a blocking agent and said blocking agents are selected from the group consisting of alcohols, phenols, oximes, heterocyclic compounds and a combination thereof.

17. The substrate of claim 13 wherein the polyurethane polyol is the product of a branched polyester polyol and a polyisocyanate.

18. The substrate of claim 17 wherein the branched polyester polyol is the reaction product of;
   a) in the range of from 20 to 80 percent by weight of one or more monofunctional carboxylic acid monomers having 2 to 17 carbon atoms;
   b) in the range of from 10 to 40 percent by weight of one or more hydroxyl functional monomers having a hydroxyl functionality of 3 to 10; and
   c) in the range of from 10 to 40 percent weight of one or more polycarboxylic acid monomers; and
wherein all percentages by weight are based on the total amount of monomers used to make the branched polyester polyol.

* * * * *